United States Patent [19]

Greiff

[11] Patent Number: 5,016,072
[45] Date of Patent: May 14, 1991

[54] SEMICONDUCTOR CHIP GYROSCOPIC TRANSDUCER

[75] Inventor: Paul Greiff, Wayland, Mass.

[73] Assignee: The Charles Stark Draper Laboratory, Inc., Cambridge, Mass.

[21] Appl. No.: 493,327

[22] Filed: Mar. 14, 1990

Related U.S. Application Data

[63] Continuation-in-part of Ser. No. 143,515, Jan. 13, 1988, abandoned.

[51] Int. Cl.⁵ .................. H01L 29/00; G01P 9/00; G01P 15/00
[52] U.S. Cl. ........................... 357/26; 357/25; 73/504; 73/505; 73/517 AV
[58] Field of Search .............. 357/26, 25; 73/505, 73/517 R, 504, 280, 517

[56] References Cited

U.S. PATENT DOCUMENTS

| | | | |
|---|---|---|---|
| 3,053,095 | 9/1962 | Korl et al. | |
| 4,342,227 | 8/1982 | Peterson et al. | 73/141 |
| 4,483,194 | 11/1984 | Rudolf | 73/517 R |
| 4,522,072 | 6/1985 | Sulouff et al. | 73/765 |
| 4,598,585 | 7/1986 | Boxenhori | 73/505 |
| 4,628,283 | 12/1986 | Reynolds | 331/68 |
| 4,670,092 | 6/1987 | Motamedi | 156/643 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 |
| 4,705,659 | 11/1987 | Bernstein et al. | 264/29.6 |
| 4,736,629 | 4/1988 | Cole | 73/517 R |
| 4,764,244 | 8/1988 | Chitty et al. | 156/630 |

OTHER PUBLICATIONS

Silicon as a Mechanical Material, Kurt E. Peterson Proceedings of IEEE, vol. 70, No. 5, May 1982.
"A Vibratory Micromechanical Gyroscope", B. Boxenhorn et al., AIAA Guidance, Navigation and Control Conference, Aug. 15-17, 1988, pp. 1033-1040.
"*Monolithic Silicon Accelerometer*", B. Boxenhorn et al., Transducers '89, Jun. 25,30 1989, pp. 273-277.
"*An Electrostatically Rebalanced Micromechanical Accelerometer*", B. Boxenhorn et al., AIAA Guidance, Navigation and Control Conference, Aug. 14-16, 1989, pp. 118-122.
"The Micromechanical Inertial Guidance System and its Application", B. Boxenhorn et al., Fourteenth Biennial Guidance Test Symposium, Oct. 3-5, 1989, pp. 113-131.

*Primary Examiner*—Rolf Hille
*Assistant Examiner*—Mahshid Saadat
*Attorney, Agent, or Firm*—Weingarten, Schurgin, Gagnebin & Hayes

[57] ABSTRACT

A semiconductor chip gyroscopic transducer is disclosed in which a semiconductor element is supported in an outer element by a flexible linkage system which is in turn supported in a frame of semiconductor material by another flexible linkage system which permits the element to vibrate about two axes relative to the frame. Balanced torque forces are provided by a system of buried and bridge electrodes. The stress and tension resulting from doping of these elements are released by a flexure beam. The inertial mass of the inner element is balanced by formation in a central pin and on-chip electronics avoids the capacitive loading effects of long runs from high impedance sources.

Flexure footings are intergrated with the structure adding stability to flexures connecting the supported gyroscopic resonator element to the supporting structure, offsetting a rippling effect inherent in the oxide structure. Flexure grooves provide selective stiffness in the flexure. The bridge electrodes are additionally electrically isolated for electrical compatibility with gyroscope electronics.

34 Claims, 7 Drawing Sheets

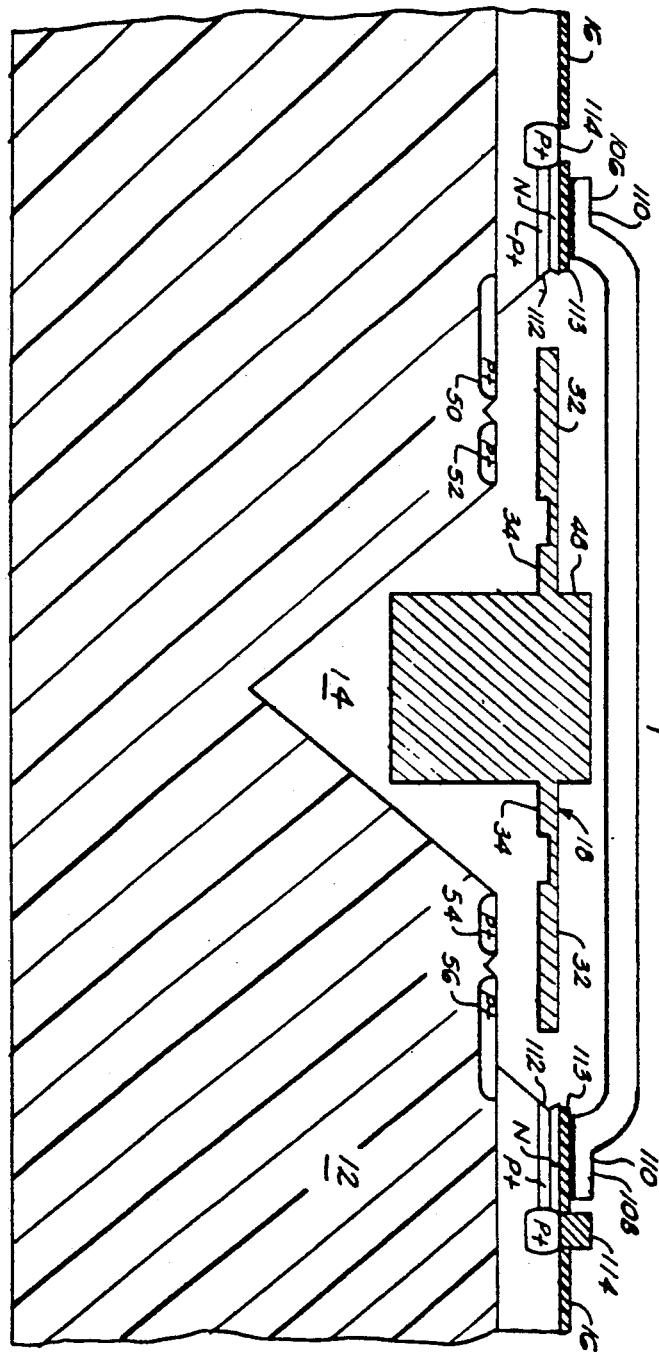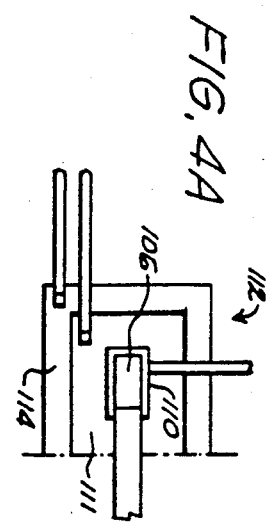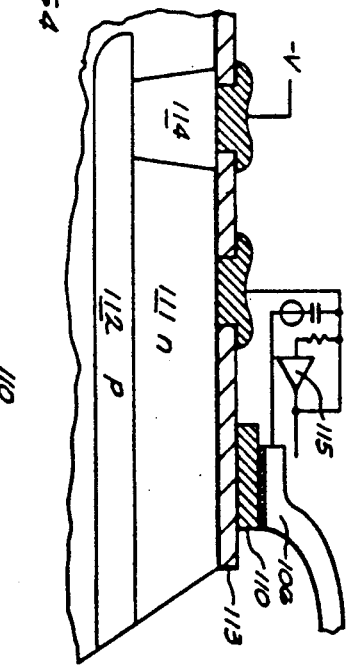

SEMICONDUCTOR CHIP GYROSCOPIC TRANSDUCER

CROSS REFERENCE TO RELATED APPLICATIONS

The present application is a continuation-in-part of co-pending commonly assigned U.S. application Ser. No. 07/143,515. Filed Jan. 13, 1988, entitled METHOD AND APPARATUS FOR SEMICONDUCTOR CHIP TRANSDUCER.

TECHNICAL FIELD

This invention relates to gyroscopic transducers and, in particular to gyroscopic transducers manufactured using semiconductor fabrication processes.

BACKGROUND ART

Semiconductor fabrication techniques are in use to produce micromechanical structures from silicon wafers. Such micromechanical structures have the potential of mass production at a very low cost.

Illustrative of this particular technology is U.S. Pat. No. 4,598,585 to Boxenhorn, which discloses a planar micromechanical vibratory gyroscope adapted for small geometry configurations which may be constructed using semiconductor fabrication mass production techniques.

Further advances in micromechanical gyroscopic transducer technology are described in Applicant's co-pending U.S. Patent Application Ser. No. 07/143,515, filed Jan. 13, 1988, entitled METHOD AND APPARATUS FOR SEMICONDUCTOR CHIP TRANSDUCER which is incorporated herein by reference.

Other advances in micromechanical gyroscopic technology are described in Applicant's pending U.S. Patent Application Ser. No. 372,653 entitled BRIDGE ELECTRODES; and U.S. Patent Application Ser. No. 07/470,938 entitled MICRO-MECHANICAL DEVICE WITH A TRIMMABLE RESONANT FREQUENCY STRUCTURE AND METHOD OF TRIMMING SAME; all of which are incorporated herein by reference.

The infancy of monolithic micromechanical semiconductor gyroscopic transduction technology assures that significant advances will continue to be made with respect to implementation and application of the technology. As structures are implemented having increased sensitivity and accuracy, problem areas are identified and solutions defined. Presently, shortcomings with respect to "rippling" of an oxide support frame from which an outer flexure extends connecting a resonating structure thereto are observable. "Buckling" of inner flexures, results in undesirable large variations in a critical resonant frequency of a suspended gyroscopic element. Furthermore, surface bridge electrodes used for sensing and for rebalancing of a certain axis of a resonating structure have large capacitances to the substrate limiting effectiveness as signal pickoffs.

SUMMARY OF THE INVENTION

In accordance with the teaching of the present invention a semiconductor chip gyroscopic transducer is disclosed in which a semiconductor element is supported in an outer element by a flexible linkage system which is in turn supported in a frame of semiconductor material by another flexible linkage system which permits the element to vibrate about two axes relative to the frame. Balanced torque forces are provided by a system of buried and bridge electrodes. The stress and tension resulting from doping of these elements are released by a flexure beam. The inertial mass of the inner element is balanced by formation in a central pit and on-chip electronics avoids the capacitive loading effects of long runs from high impedance sources.

In addition, flexure footings are integrated with the structure adding stability to flexures connecting the supported gyroscopic resonator element to the supporting structure, offsetting a rippling effect inherent in the oxide structure. Flexure grooves provide selective stiffness in the flexure. The bridge electrodes are additionally electrically isolated for electrical compatibility with gyroscope electronics.

BRIEF DESCRIPTION OF THE DRAWINGS

The invention will be more fully understood from the following detailed description of illustrative embodiments taken in conjunction with the accompanying drawing in which:

FIG. 4 is a cross-section view of the semiconductor chip gyroscopic transducer of FIG. 1 taken along a line Y—Y;

FIG. 4A is a top view of an electrically isolated bridge electrode landing;

FIG. 4B is a side section view of the isolated landing of FIG. 4A;

DETAILED DESCRIPTION OF THE INVENTION

Figure 1:
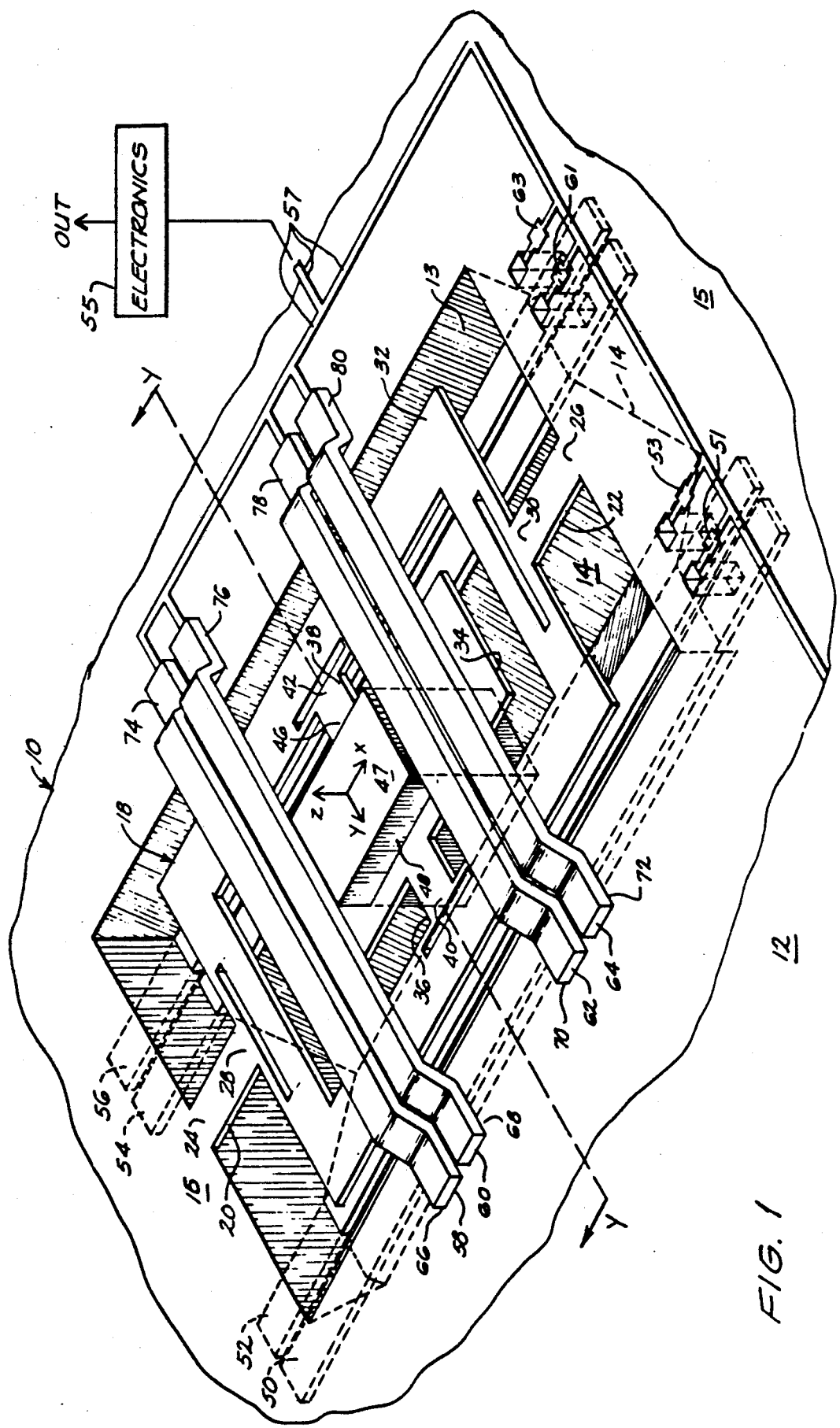
FIG. 1 is a perspective view partially cut away of a semiconductor chip gyroscopic transducer according to the invention.

A micromechanical gyroscopic transducer 10, as viewed in FIG. 1, is formed from a mass of N-type silicon 12. Mass 12 is preferably an N-type epitaxially grown layer 13 on a base of monocrystalline N-type silicon 15. Selective etching of the silicon 12 as described in the above-referenced applications yields a void 14 within a silicon frame 16. A transducer element 18, which has been doped P-type and is freed from silicon mass 12 as a result of selective etching is suspended above the void 14. The transducer element 18, comprising outer and inner portions 32 and 34 respectively, is supported by flexible links or flexures 20 and 22, similarly freed by selective etching, which provide first flexible linkage means coupling the portion 32 of transducer element 18 to the silicon frame 16. Flexures 20 and 22 each have first ends 24 and 26 respectively, extending from the silicon frame 16. Second ends 28 and 30 of flexures 20 and 22 respectively, connect with the first portion or gimbal plate 32 of the transducer element 18. First gimbal plate 32 flexibly supported by flexures 20 and 22 is capable of limited rotation about an X-axis extending through flexures 20 and 22.

Interior to gimbal plate 32 of transducer element 18 is the second portion, or a second gimbal plate 34. A second set of flexures 36 and 38 provide a second flexible linkage means for coupling the second gimbal plate 34 to the first gimbal plate 32. Second flexures 36,38 have first ends 40,42 and second ends 44,46, respectively. The first ends 40,42 of flexures 36,38 are connected to first gimbal plate 32. The second ends 44,46 are connected to second gimbal plate 34. Second gimbal plate 34 is capable of limited rotation about a Y-axis, orthogonal to the X-axis, extending through the first ends 40,42 and second ends 44,46 of the flexures 36,38 respectively. Second gimbal plate 34 supports a centrally located mass 48 which is substantially balanced between top and bottom of the second gimbal plate 34. Substantially balanced mass 48 is formed on second gimbal plate 34 by selectively etching a trough therein. The process, discussed in significant detail in above-referenced U.S. Patent Application Ser. No. 143,515, includes provision of a deep pit, through the surface of silicon mass 12 where mass 48 is to be located, prior to etch resistant doping of the plate 34. After etching, the pit remains and may be filled with single crystal or polysilicon followed by a solid electroplating on a layer of titanium tungsten (TiW) covered with a layer of gold (Au) deposited via vacuum deposition. A mass of gold may alternatively be electroplated into the pit on the layer of vacuum deposited gold. A Z-axis is defined by the central location of the topside and bottomside of the substantially balanced mass 48. The process of metal plating on silicon is discussed below.

In the illustrative embodiment of FIG. 1, the micromechanical gyroscopic transducer 10 has four integral or buried electrodes 50,52,54,56 extending beneath the first gimbal plate 32 substantially parallel to the X-axis. The buried electrodes 50,52,54,56 are typically P+doped semiconductor material formed in base layer 15 prior to the growth of epitaxial layer 13. With the typically N-type silicon mass these form P-N junctions. Typically, two of the electrodes are used for torquing the transducer element 18 and two are used for sensing and vibration angle amplitude control. Buried electrode functionality is facilitated by electrical connection through a deep P+diffusion to the buried electrodes which are in turn surface metallized and connected to contacts 51,53,61,63 on frame 16 which are in turn electrically connected to associated on- or off-chip drive and sense electronics 55 on signal bus 57 that cause controlled amplitude vibration of plate 32 as discussed below.

Additionally, the micromechanical gyroscopic transducer 10 has four surface bridging electrodes 58,60,62 and 64 which span the transducer element 18 and are bonded to silicon frame 16 at respective electrode landings 66,68,70,72, 74,76,78 and 80. The bridge electrodes 58,60,62,64 reside above the second gimbal plate 34, two each on either side of substantially balanced mass 48, parallel to the Y-axis defined by first and second ends of flexures 36,38 for torquing and sensing position of the plate 34. For this purpose, they are connected to signal bus 57 and electronics 55. Bridge electrodes are fabricated using metal plating technology discussed in the referenced application.

Functionally, the second gimbal plate 34 with substantially balanced mass 48 supported by flexures 44,46 is the gyro sensing element. First gimbal plate 32 is a driven member which is caused to vibrate at a fixed frequency and angular amplitude about the X-axis. The fixed frequency of vibration with which the first gimbal plate 32 is driven is the resonant frequency of the second gimbal plate 34 with substantially balanced mass 48. Vibration of the first gimbal plate 32 is induced by applying appropriate alternating DC voltages to the outer buried electrodes 50,56, in order to produce an electrostatic torque. The inner buried electrodes 52,54 sense first gimbal plate 32 vibration angle amplitude. Electronics 55 provides feedback control over the torque to insure a fixed amplitude. The torque electrodes are preferably buried for stability. The resulting dynamical system is sensitive to rotation of the structure about a Z-axis orthogonal to the X and Y axes and passing through the balanced mass 48. When rotation of the system about the Z-axis occurs, second gimbal plate 34 with substantially balanced mass 48 oscillates at its resonant frequency at an amplitude proportional to the rate of rotation applied.

Surface bridge electrodes 58,60,62,64 spanning transducer element 18 in proximity to second gimbal plate 34 are used for sensing and for rebalance of the second gimbal plate 34 with substantially balanced mass 48, nulling its tendency to vibrate. Because the gyro described hereinbefore in an open loop condition is very sensitive to parameter variations such as small changes in the resonant frequency of second gimbal plate 34 or small changes in the angle of vibration, it is a practical necessity to operate the gyro in a closed loop condition to minimize this sensitivity. Closed loop operation requires that the gyro be incorporated into a rebalance loop that maintains second gimbal plate 34 at null by torquing the second gimbal plate 34 electrostatically. By torquing second gimbal plate 34 null the gyro system can tolerate variations in vibration frequency. Closed loop operation enables the drive vibration angle amplitude of first gimbal plate 32 to be increased without cross-coupling interactions with the second gimbal plate 34, since second gimbal plate 34 is maintained near null by closed loop rebalancing.

Closed loop rebalancing is facilitated by two quadrature servo-loops in electronics 55 operating in conjunction. The servo-control electronics, as shown in the referenced application, will rebalance second gimbal plate 34 so that the effect on nonorthogonality of the gimbals and the unbalance of the second gimbal plate 34 will be minimized. The output of the control electronics 55 is a voltage proportional to the torque required to rebalance the second gimbal plate 34 against gyroscopic torques. A third servo-controlled loop is required to maintain vibration drive angle of first gimbal plate 32 at a fixed value. The third servo-control loop is similar to the control loops of second gimbal plate 34 but allows a much lower bandwidth.

The desirability of surface bridge electrodes as opposed to an increased number of integral or buried electrodes, results from a large voltage dependent parasitic capacitance to the semiconductor mass 12 inherent in such buried electrodes. Furthermore, buried electrodes exhibit a small leakage current and are limited with respect to the voltage which can be applied, that being the reverse breakdown voltage of a P-N junction, typically about 40 volts. Buried electrode utility is also limited in a micromechanical gyroscopic transducer application since although they can be disposed in a manner parallel to an X-axis of rotation of the first gimbal plate they cannot concurrently be disposed in a manner perpendicular to that same axis of rotation (or parallel to a Y-axis of rotation of the second gimbal plate). Because surface bridge electrodes can be disposed perpendicular to buried electrodes, the surface bridge electrodes can be aligned in proximity and parallel to the axis of rotation of second gimbal plate 34 while buried electrodes are aligned in proximity and parallel to the axis of rotation of first gimbal plate 32. A single pair of bridge electrodes can replace the double pair 58,60,62 and 64 by using separate frequencies for sensing and rebalance torquing. Furthermore, a pair of surface bridge electrodes may be used as differential signal pickoffs as discussed hereinafter.

Figure 2:
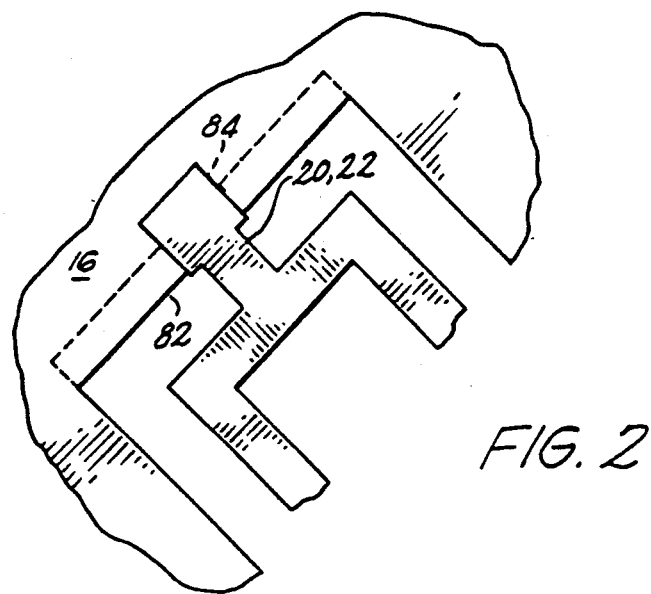
FIG. 2 is an expanded view of a semiconductor chip gyroscopic transducer flexure/frame junction with a footing according to the invention.
Figure 2A:
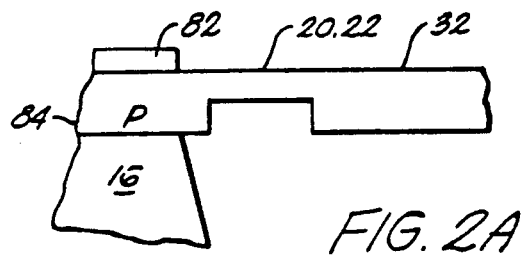
FIG. 2A is an expanded side view of a P-type footing disposed at the flexure/frame junction of FIG. 2.

In the selective etching of void 14, wherein silicon frame 16, the double gimbal plates 32,34 and double flexible linkage system are left intact, an undercutting of silicon dioxide surface portions adjacent flexures 20 and 22 leaves an unsupported lip 82 which is subject to rippling (FIG. 2). The geometric variations induced by rippling along the lip 82 causes a variation in twist on flexures 20,22 supporting transducer element 18 in silicon frame 16. The resultant twisting forces exerted on the flexures 20,22, caused by the rippling, adversely impact the vibratory characteristics and angular bias of first gimbal plate 32 which consequently affects the gyroscopic sensitivity of second gimbal plate 34. The detrimental effect of the rippling of the silicon dioxide lip 82 which is typically 0.6 micron in thickness at the undercut, according to the invention, is prevented by employing a 3 micron P-type diffusion or footing 84 at the junction of flexures 20,22 and silicon frame 16. The disposition of footing 84 is best viewed in FIG. 2A. It can be seen that N-type silicon frame 16 has disposed therein P-type footing 84 at the junction of silicon frame 16 and flexures 20 and 22 which prevents undercutting to either side of the flexures 20,22 by the selective etching of void 14. P-type footing 84 acts as a buffer between rippled portions 82 precluding the twisting which otherwise results, while maintaining P-N junction isolation of the double gimbal double flexure transducer from silicon frame 16.

Figure 3:
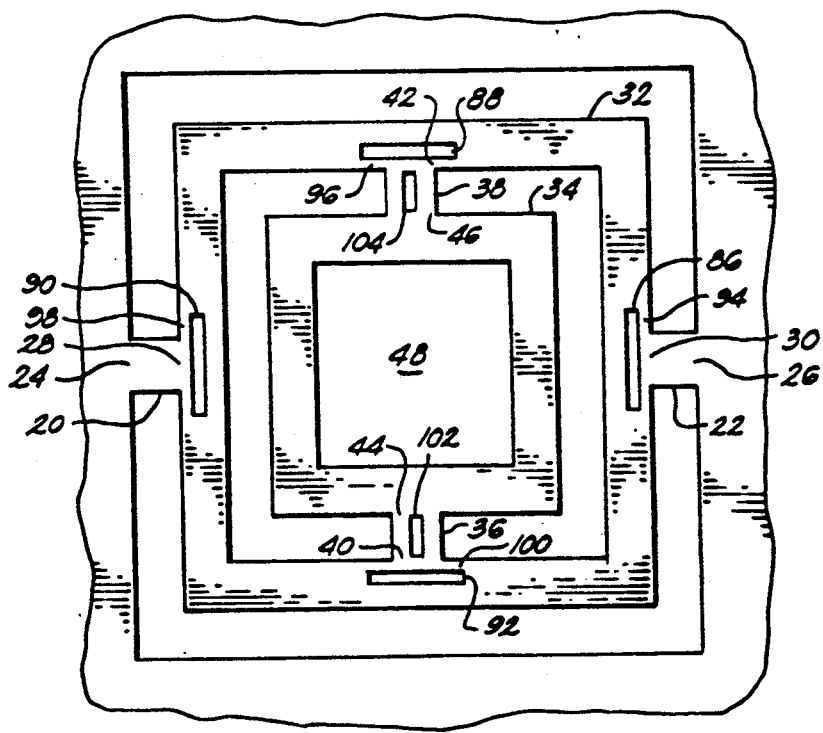
FIG. 3 is a conceptual view of a semiconductor chip gyroscopic transducer having a strain relief and torsional stiffness system and footings according to the invention.

Referring now to FIG. 3, a double flexure double gimbal plate micromechanical gyroscopic transducer is provided, in combination, with a strain relief and torsional stiffness system. This is provided by grooved flexures and strain relieving slots defining tension relief beams at the junction of the flexures and outer gimbal plate 32.

As shown there, gimbal plate 32 has disposed therein four slots 86,88,90 and 92, which form stress relief beams 94,96,98 and 100, respectively. Slots 86 and 90 are disposed in proximity to the inner ends of flexures 20 and 22 such that the tension relief beams 94 and 98 are formed at the point where the flexures 20,22 join the plate 32. Slots 88 and 92 are placed where flexures 36 and 38 join plate 32 and form beams 96 and 100.

The outer gimbal 32 is in tension because its etch resistance results from boron doping which reduces the lattice spacing with respect to the surrounding N-type doped mass 12. The result is that the undercut structure tries to shrink but is restrained by the larger stiffer mass 12 and this puts gimbal plate 32 in tension. In the axis through flexures 36,38 the structure is free to shrink. Since the gimbal 32 is thicker than the flexures 36,38 it must be more heavily doped and therefore shrinks at a higher rate putting flexures 36,38 in compression. Beams 94,96,98 and 100 are trimmable in a manner described, in co-pending U.S Patent Application Ser. No. 07/470,938 entitled MICRO-MECHANICAL DEVICE WITH A TRIMMABLE RESONANT FREQUENCY STRUCTURE AND METHOD OF TRIMMING SAME. The above referenced application provides that "tensile forces . . . cause tension relief beam . . . to be deflected or bowed a distance . . . Deflection of tension relief beam . . . reduces the tension between resonant structure . . . and frame . . . to a small portion, approximately 0.1% to 1% of the yield strength, which is an acceptable number and in so doing, serves to lower the resonant frequency of resonant structure . . . by reducing the tortional stiffness of flexures." The slot that creates the beam which alleviates the tension forces on the plate 32 also affects the resonant frequency of gimbal plate 32. By trimming the slot and beam sizes the resonant frequency can be controlled. Trimming beams 96,100, provides compression relief as discussed above.

Grooves 102 and 104 are formed in flexures 36 and 38 respectively. While stress relieving beams 96 and 100 impact the torsional dynamics of the second flexible linkage means, grooves 102 and 104 provide a three-dimensional beam structure that is relatively soft in the desired torsional mode yet is substantially stiffer. This reduces unwanted buckling or bending of flexures 36 and 38. The same kind of grooves may be provided in flexures 20 and 22 with the same result, although they are not shown.

Figure 3A:
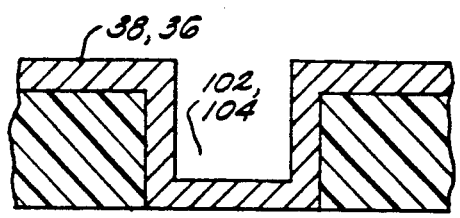
FIG. 3A is a side sectional view of flexure grooves according to the invention, formed by plasma etching
Figure 3B:
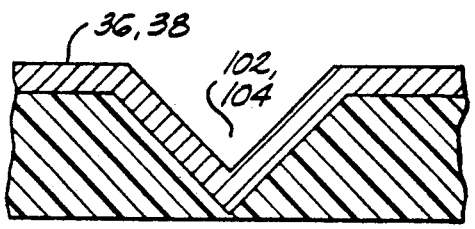
FIG. 3B is a side sectional view of flexure grooves according to the invention, formed by anisotropic etching.

FIGS. 3A and 3B illustrate the construction of such a groove. Pits 102,104 are formed by a plasma or other etching process, as known in the art, prior to the P-type diffusion that defines the flexures. The diffusion thus takes the form of a groove or channel, providing box beam stiffening.

Referring now to FIG. 4, there is shown a cross-sectional view of the micromechanical gyroscopic transducer, according to the invention. A bridge electrode 64 is shown and is constructed in a manner described in co-pending U.S. Patent Application Ser. No. 372,653 entitled BRIDGE ELECTRODES, incorporated herein by reference. Another bridge electrode 58 is located behind electrode 64 and therewith span the transducer element 18 above the second gimbal plate 34, a few microns therefrom.

Each bridge electrode has opposite landings or terminations represented by landings 106,108 illustrated in FIGS. 4, 4A, 4B and 4C, disposed on the silicon frame 16. The electrode landings are formed over metallization layer 110. An oxide layer 113 provides DC electrical isolation but capacitance to substrate is still large. In some cases (i.e. where the bridge electrodes are used at high impedance for signal pickoff instead of excitation from a low impedance source) this capacitance adversely affects the signal.

Figure 4C:
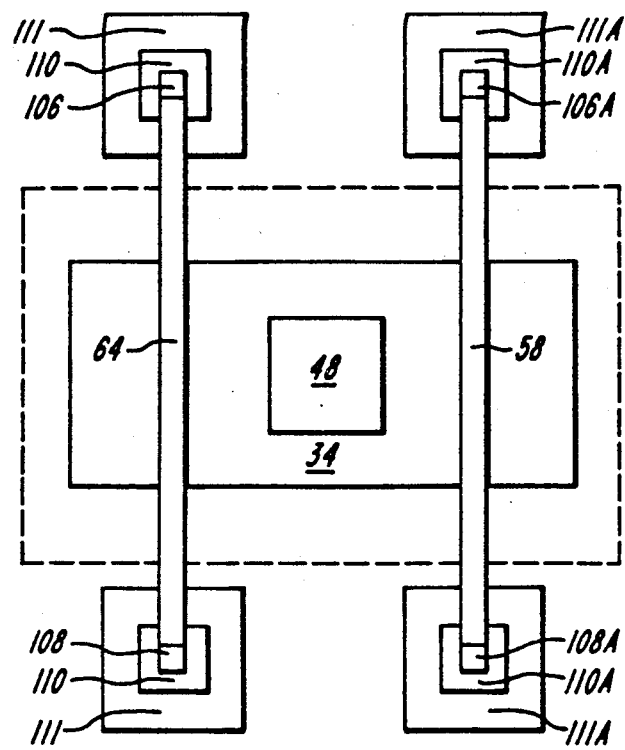
FIG. 4C is a top, diagrammatic view of a micromechanical gyroscopic transducer having signal pickoff by inner bridge electrodes with electrically isolated landings.

The construction illustrated in FIGS. 4A and 4B provides a driven shield to effectively neutralize this capacitance. As shown also in FIG. 4C electrical isolation regions 111 and 111a are provided under the landings of the signal pickoff bridges 64 and 58. In the discussion to follow it is understood that both regions 111, on both sides of the bridge, are treated the same electrically. This is true of regions 111a as well. Regions 111 and 111a are DC isolated by the surrounding P regions 112,114. By circuitry described below and illustrated in FIG. 6C, the region 111 is driven at the same (or nearly the same) potential as electrode landing 106 and the capacitance between them is thus electrically neutralized, maximizing the signal-to-noise ratio at the point of pickoff.

Figure 5:
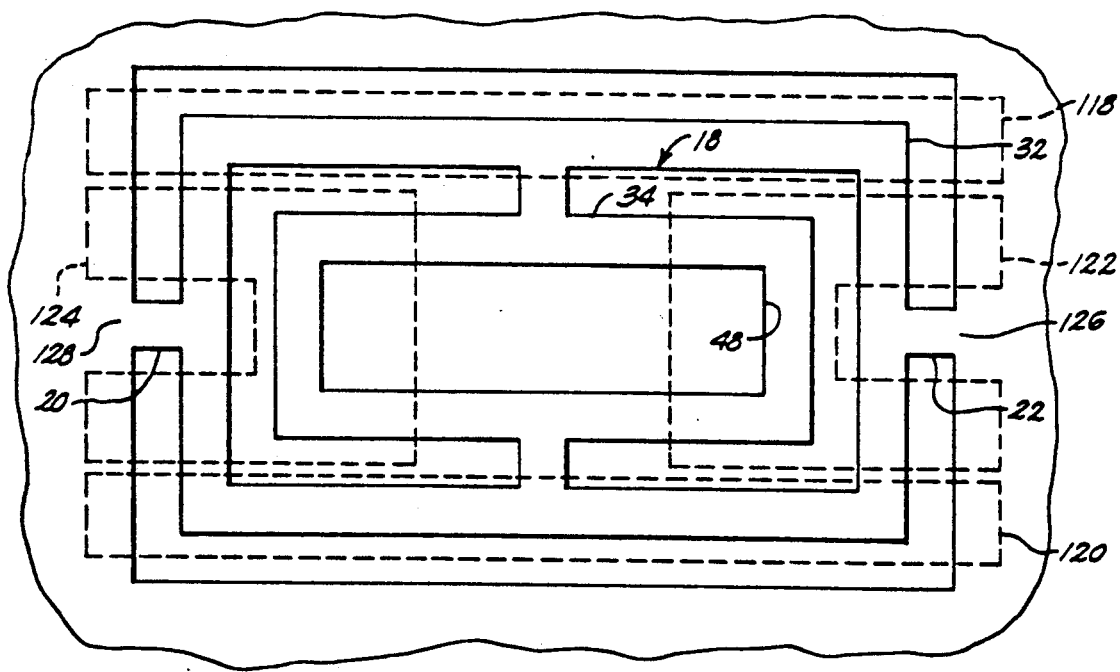
FIG. 5 is an alternative embodiment of a semiconductor chip gyroscopic transducer having four buried electrodes and two bridge electrodes according to the invention.

An alternative electrode arrangement for a micromechanical gyroscopic transducer, according to the invention, is illustrated in FIG. 5. In this embodiment four buried electrodes are configured in combination with two surface bridge electrodes one each replacing a pair 58/60 and 62/64 of FIG. 1, to effect the micromechanical gyroscopic transduction function as described hereinbefore.

Outer buried electrodes 118,120 are disposed below outer gimbal plate 32 parallel to the axis formed by the flexures 20,22 and serve as torquing electrodes providing the function of driving outer gimbal plate 32 at one frequency, sensing the displacement at a second frequency and controlling the first frequency drive to achieve a controlled vibration as described in the referenced application.

Inner buried electrodes 122,124, are disposed between buried electrodes 118,120 and loop beneath opposite ends of plate 34 from opposite ends of transducer element 18. Inner buried electrodes 122/124 provide the function of rebalance torquing, with a drive voltage, typically 1.0 mV, which rebalances or drives to null inner gimbal plate 34 with mass 48. Inner buried electrodes 122,124 have cutouts 126,128 around the region of flexures 20,22.

In this embodiment, two surface bridge electrodes, not shown, are configured as discussed hereinbefore with respect to the four bridge electrodes of FIG. 1. However, whereas four bridge electrodes were configured in proximity to inner gimbal plate 34, two on either side of balanced mass 48, parallel to the Y-axis defined by first and second ends of flexures 36,38, in the embodiment of FIG. 5, only one bridge electrode is configured on either side of balanced mass 48, parallel to the Y-axis and [n proximity to inner gimbal plate 34. The two bridge electrodes are used to sense inner gimbal plate 34 motion, while an excitation frequency is applied through flexures to the inner gimbal plate 34. The bridge electrode may be located to provide vertical symmetry with respect to the rebalance torquing buried electrodes 122,124.

Figure 6C:
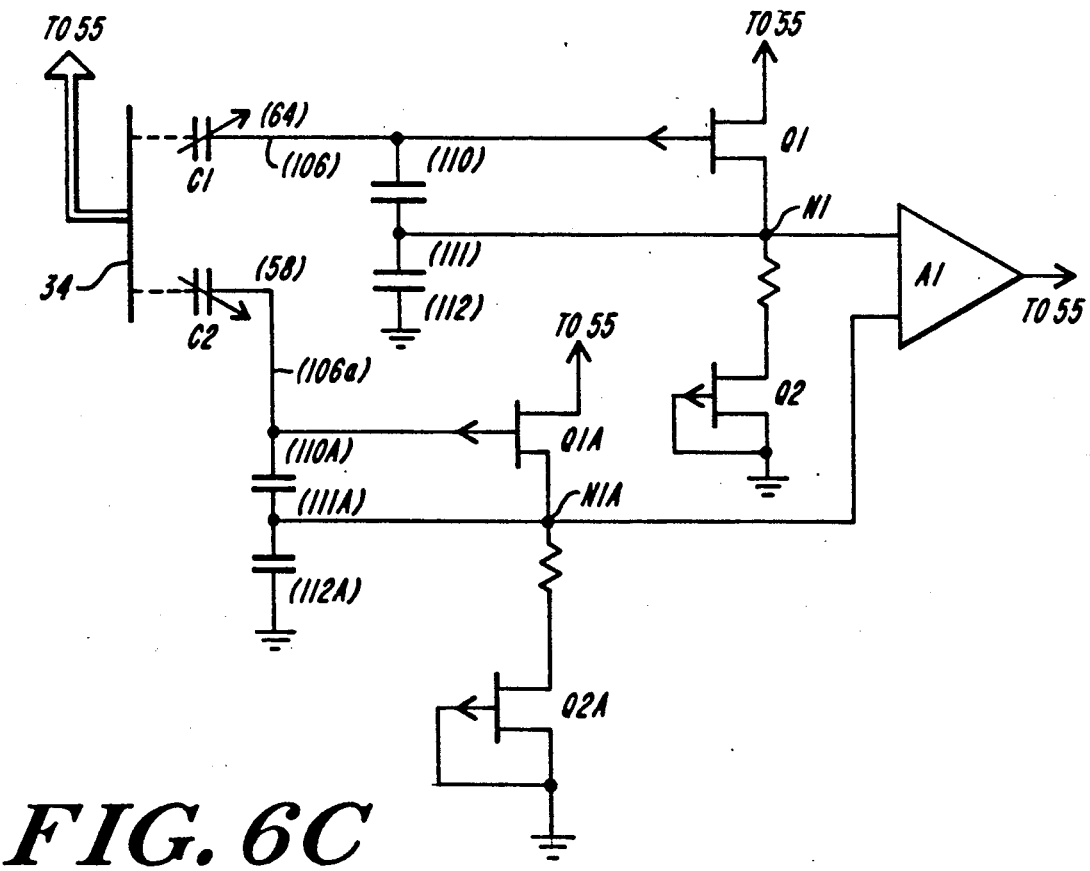
FIG. 6C is a schematic diagram of electronic circuitry for the gyroscopic transducer of FIG. 4C having bridge electrode signal pickoff.
Figure 6A:
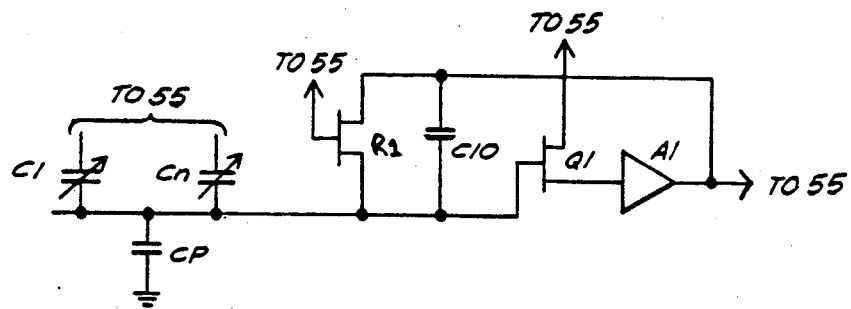
FIG. 6A is a side section and perspective view of a micromechanical gyroscopic transducer having an on-chip JFET buffer for amplifying a signal picked off of a flexure.

Shown in FIG. 6A is electrical circuitry for on-chip signal processing to limit the effect of parasitic capacitance in long signal paths in an embodiment wherein an excitation frequency is applied to inner gimbal plate 34 through bridge or buried electrodes and a signal indicating inner gimbal 34 motion is sensed at a flexure node 200. An electrical equivalent circuit diagram, illustrated in FIG. 6B, of the micromechanical gyroscopic transducer capacitances includes capacitances $C_1$-$C_n$ and Cp wherein $C_1$-$C_n$ represent the variable capacitances resulting from the distance of the inner gimbal plate 34 relative to n excited buried and bridge electrodes. The resulting signal at the gimbal plate 34 is sensed through flexures and outer gimbal plate 32 to frame 16. A parasitic capacitance Cp between the structure 18 and the semiconductor mass 12 acts as a shunt and is large enough to reduce the signal to noise ratio particularly if it includes any length of signal path prior to impedance buffering. For this purpose the gimbal signal is buffer amplified by an on-chip JFET which minimizes the effect of shun capacitance from long lead lengths by reducing the impedance of the signal for application to off-chip electronics 55 as described in the above-referenced application to provide the signals necessary to electronically torque the instrument and derive rate outputs.

Figure 6B:
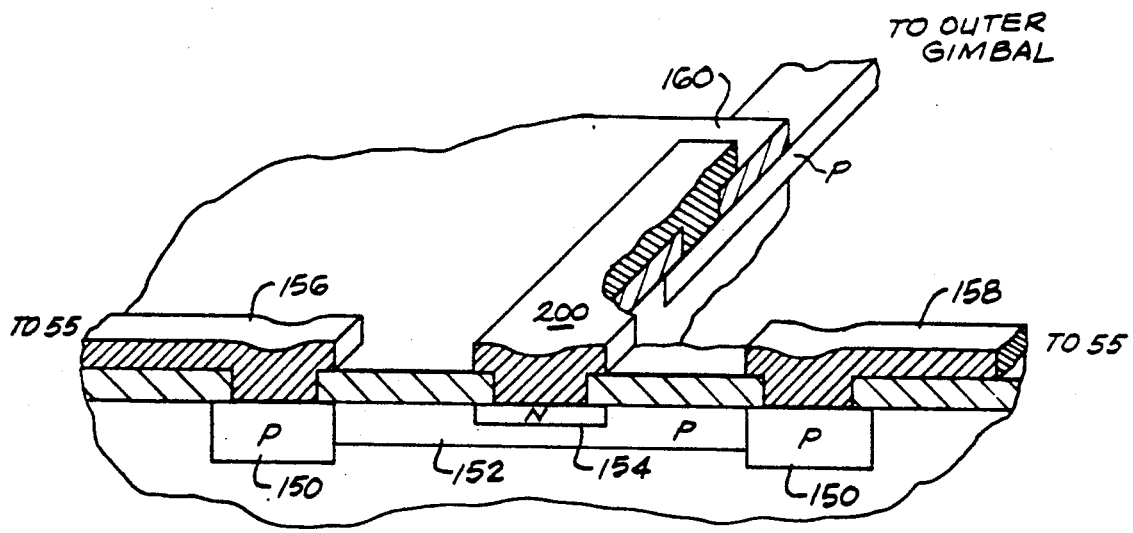
FIG. 6B is a schematic diagram of a micromechanical gyroscopic transducer including the on-chip JFET buffer amplifier of FIG. 6A.

As illustrated in FIG. 6B the signal from the inner gimbal 34 is present at output node 200 which is connected to the gate of a high input impedance JFET $Q_1$ which is fabricated on-chip and proximate to the signal source as an impedance buffering preamplifier to overcome the effects of parasitic capacitance. Transistor $Q_2$ is fabricated along with $Q_1$ as a matched pair. In connection with amplifier $A_1$ (on- or off-chip), it serves to bias the gate of $Q_1$ at a virtual ground. This provides a stable reference for the torque electrodes shown as $C_n$. Electronics 55 provides the drive signals for capacitors $C_1$ through $C_n$, the biases for $R_1$ and the drains of $Q_1$ and $Q_2$. Amplifier $A_1$ is typically a unity voltage gain high gain amplifier providing feedback to an on-chip RC combination $R_1$ and $C_{10}$ which provides signal stabilization. The output of operational amplifier $A_1$ is processed by electronics 55.

As illustrated in FIG. 6A the on-chip JFET buffer amplifier $Q_1$ is fabricated on the chip in proximity to a flexure frame junction to ensure minimum parasitic capacitance and high stability. Furthermore, the RC combination of $R_1$ and $C_{10}$ may also be provided on-chip. $R_1$ may be fabricated in the megohm range from polysilicon or it may be formed on-chip as a biased JFET as shown in FIG. 6B. $C_{10}$ may be a MOS device fabricated on-chip. The p regions 150 doped to act as sources and drain (the p channel 152 and the gate 154 being diffused separately) in the on-chip JFETs may be fabricated as highly doped regions during the boron doping process steps used to make flexure and gimbal plate etch resistant structures as discussed hereinbefore or in separate steps. Metallizations 156 and 158 for the source and drain and for gate 154, respectively required for electrical contact to the on-chip JFET can be provided during metallization process steps undertaken during the fabrication of the micromechanical gyroscopic transducer structure as described in the above. Metalization 154 extends to an aperture in layer 160 where it contacts a doped flexure to the outer gimbal plate.

An embodiment wherein an excitation frequency is applied to inner gimbal 34, as illustrated in FIG. 4C, may provide a better signal-to-noise ratio when the signal indicating inner gimbal 34 motion is sensed differentially by a pair of surface bridge electrodes 58,64. Surface bridge electrodes, as discussed in the referenced application, can provide lower capacitance than buried electrodes and can be electrically isolated by driven shields provided at the bridge electrode landings 106 as discussed hereinbefore with respect to FIGS. 4, 4A, 4B and 4C. An electrical model of such a configuration and an illustration of a JFET buffer preamplifier located proximate to the bridge electrode landing are shown in FIGS. 6C and 6D, respectively.

Figure 6D:
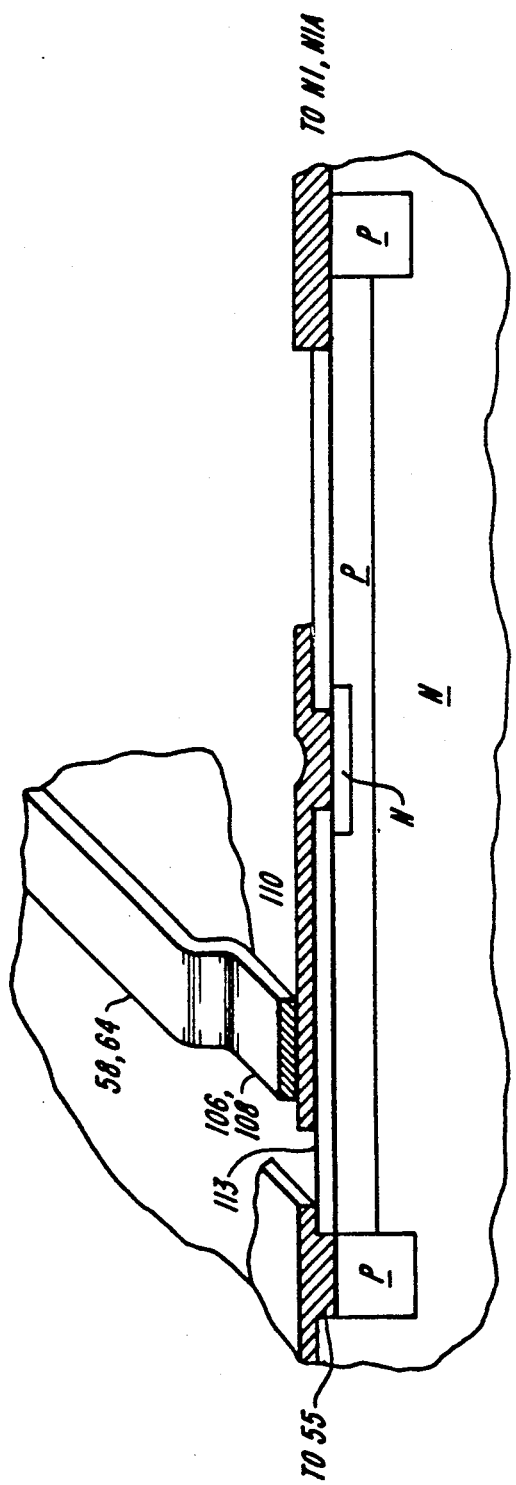
FIG. 6D is a side section and perspective view of a micromechanical gyroscopic transducer having on-chip JFET buffer circuitry in proximity to pickoff bridge electrodes.

Referring to FIGS. 6C and 6D, a high frequency approximately 100 kHz signal is inserted on inner gimbal plate 34 by electronics 55. Bridges 64 and 58 serve as a differential capacitive pickoff. Areas 110,110a of the bridges have relatively high capacitance to the electrically isolated regions 111,111a. The differential signals from $C_1$ and $C_2$ are fed to the gates of JFETs $Q_1$ and $Q_{1a}$ which serve as buffer amplifiers to greatly lower the signal impedance and isolate it from electrical interference. Transistors $Q_2$ and $Q_{2a}$ and external electronics 55 (not shown in FIG. 6C) form a biasing network for the gates of $Q_1$ and $Q_{1a}$. Amplifier $A_1$ is a differential amplifier (either on- or off-chip) which differences and amplifies the positional signal. Nodes $N_1$ and $N_{1a}$ are low impedance reference nodes which track the gate voltage in phase and amplitude and which may be used to drive regions 111 and 111a thereby effectively neutralizing the parasitic capacitance from regions 110,110a to 111,111a. The result is a greater signal-to-noise ratio.

Although the invention has been shown and described with respect to exemplary embodiments thereof various other changes, omissions and additions in form and detail thereof may be made therein without departing from the spirit and scope of the invention.

What is claimed is:

1. A micromechanical gyroscopic transducer comprising:
   a mass of semiconductor material having a void on a top surface extending downward, said mass of silicon comprising a silicon frame;
   a transducer element suspended above said void, said transducer element comprising:
      first and second flexible linkages integral with said frame material for coupling said transducer element to said frame at opposite ends, first ends of said first flexible linkages being connected to said silicon frame;
      a first gimbal plate integral with said frame material connected to said second ends of said first and second flexible linkages, said first gimbal plate being capable of oscillatory motion about an axis through said first and second flexible linkages;
      a second gimbal pate, interior to said first gimbal plate;
      third and fourth flexible linkages integral with said frame material coupling said second gimbal plate to said first gimbal plate on opposite ends, said third and fourth flexible linkages having first ends and second ends, said first ends of said third and fourth flexible linkages being connected o said first gimbal plate and said second ends of said third and fourth flexible linkages being connected to said second gimbal plate, said second gimbal plate being capable of oscillatory motion about an axis through said third and fourth flexible linkages;
      a substantially balanced mass, central to said second gimbal plate, said substantially balanced mass having a top side and a bottom side defining an axis therebetween;
   first and second sets of electrodes configured within said mass in a bottom region of said void and integral with said frame material, said first set of integral electrodes facing said first gimbal plate and said second set of integral electrodes facing said second gimbal plate; and
   a plurality of bridge electrodes configured above said transducer element, each of said plurality of bridge electrodes being supported from said frame at an electrode landing and extending over at least one of said first and second gimbal plates.

2. The micromechanical gyroscopic transducer of claim 1 wherein said mass is monocrystalline silicon and said void is anisotropically etched therein.

3. The micromechanical gyroscopic transducer of claim 2 wherein said first and second gimbal plates include etch resistant dopants and are formed by selective etching of said mass.

4. The micromechanical gyroscopic transducer of claim 1 wherein said flexible linkages include etch resistant dopants and are formed by selective etching of said mass.

5. The micromechanical gyroscopic transducer of claim 1 wherein said first gimbal plate includes means for relieving stress adjacent one or more of said flexible linkages.

6. The micromechanical gyroscopic transducer of claim 5 wherein said means for relieving stress comprises a beam created by a slot.

7. The micromechanical gyroscopic transducer of claim 6 wherein said slot is proximate to said second ends of said first and second flexible linkages.

8. The micromechanical gyroscopic transducer of claim 6 wherein said slot is orthogonally disposed with respect to said axis of said first and second flexible linkages.

9. The micromechanical gyroscopic transducer of claim 6 wherein said slot is proximate to said first ends of said third and fourth flexible linkages.

10. The micromechanical gyroscopic transducer of claim 6 wherein said slot is orthogonally disposed with respect to said axis of said third and fourth flexible linkages.

11. The micromechanical gyroscopic transducer of claims 6, 7, or 8 wherein said slot is trimmed to adjust a beam formed by said slot said beam defining a resonant frequency of said first gimbal plate as supported by said first and second flexible linkages.

12. The micromechanical gyroscopic transducer of claims 6, 9, or 10 wherein said slot is trimmed to adjust a beam formed by said slot, said beam defining a resonant frequency of said second gimbal plate.

13. The micromechanical gyroscopic transducer of claim 1 wherein at least two opposite ones of said flexible linkages further include a depressed portion extending in a direction parallel to the axis defined by said opposite linkages to stiffen said linkages against buckling and bending without corresponding torsional stiffening.

14. The micromechanical gyroscopic transducer of claim 13 wherein said depressed portion is formed by plasma etching.

15. The micromechanical gyroscopic transducer of claim 13 wherein said depressed portion is formed in said flexible linkages by anisotropic etching.

16. The micromechanical gyroscopic transducer of claim 1 wherein said first and second flexible linkages join said frame at a footing region of doped material which region beyond said first ends of said first and second flexible linkages to reduce twisting thereof.

17. The micromechanical gyroscopic transducer of claim 16 wherein said footing region is a P-type material.

18. The micromechanical gyroscopic transducer of claim 1 wherein said substantially balanced mass comprises a gold plated top portion extending above said void.

19. The micromechanical gyroscopic transducer of claim 18 wherein said balanced mass includes a polysilicon portion under said gold top portion.

20. The micromechanical gyroscopic transducer of claim 18 wherein said balanced mass includes a single crystal silicon portion under said gold top portion.

21. The micromechanical gyroscopic transducer of claim 18 having a titanium tungsten metal layer below said gold.

22. The micromechanical gyroscopic transducer of claim 21 having a gold layer above the titanium tungsten layer.

23. The micromechanical gyroscopic transducer of claim 22 wherein said titanium tungsten and gold layers are deposited by vacuum deposition.

24. The micromechanical gyroscopic transducer of claim 18 wherein said gold mass is plated on said second metal by electroplating.

25. The micromechanical gyroscopic transducer of claim 1 wherein said integral electrodes are formed as a highly doped P-type region patterned on an N-type silicon sub-surface.

26. The micromechanical gyroscopic transducer of claim 25 wherein said void is in an N-type layer epitaxially grown over said sub-surface.

27. The micromechanical gyroscopic transducer of claim 1 wherein said integral electrodes are electrically connected through a doped region to a metallized contact on said silicon frame.

28. The micromechanical gyroscopic transducer of claim 1 wherein said bridge electrodes are configured above and facing said second gimbal plate.

29. The micromechanical gyroscopic transducer of claim 1 wherein said bridge electrodes are supported above said frame on a region of doped material.

30. The micromechanical gyroscopic transducer of claim 29 wherein said region of doped material comprises an isolating wall, an isolating floor and an isolating intermediate area and a driven shield whereby each of said plurality of bridge electrodes is effectively isolated by biasing said doped region relative to said mass material.

31. The micromechanical gyroscopic transducer of claim 30 wherein said isolating wall and said isolating floor comprise P-type doped semiconductor material.

32. The micromechanical gyroscopic transducer of claim 30 wherein said isolating intermediate area is an N-type semiconductor material.

33. The micromechanical gyroscopic transducer of claim 1 further comprising a junction field effect transistor fabricated in said semiconductor mass.

34. The micromechanical gyroscopic transducer of claim 1 wherein said gimbal plates are thicker than said flexible linkages.

* * * * *

UNITED STATES PATENT AND TRADEMARK OFFICE
CERTIFICATE OF CORRECTION

PATENT NO. : 5,016,072
DATED : May 14, 1991
INVENTOR(S) : Paul Greiff

It is certified that error appears in the above-identified patent and that said Letters Patent is hereby corrected as shown below:

```
     Title page, item [57]:
     In the Abstract, line 11, "pin" should read --pit--;

Column 7, line 62, "[n proximity" should read --in
proximity--;

Column 8, line 20, "amplied" should read --amplified--;

Column 8, line 21, "shun" should read --shunt--;

Column 9, line 62, "connected 0" should read --connected
to--.
```

Signed and Sealed this

Seventh Day of June, 1994

*Attest:*

BRUCE LEHMAN

*Attesting Officer*  *Commissioner of Patents and Trademarks*